J. E. GRAYBILL & P. McJUNKIN.
ELECTRIC METER.
APPLICATION FILED JUNE 9, 1904.

1,019,456.

Patented Mar. 5, 1912.

2 SHEETS—SHEET 1.

Witnesses
Jas E Hutchinson
Thos. Howe

Inventors
John E Graybill,
Paul Mc Junkin,
by Fisher, Freeman & Watson,
Attorneys.

J. E. GRAYBILL & P. McJUNKIN.
ELECTRIC METER.
APPLICATION FILED JUNE 9, 1904.

1,019,456.

Patented Mar. 5, 1912.

2 SHEETS—SHEET 2.

Witnesses:
Jas E Hutchinson
Thos. Howe

Inventors
John E. Graybill,
Paul McJunkin,
by Foster, Freeman & Watson
Attorneys.

UNITED STATES PATENT OFFICE.

JOHN E. GRAYBILL AND PAUL McJUNKIN, OF YORK, PENNSYLVANIA, ASSIGNORS TO GENERAL ELECTRIC COMPANY, A CORPORATION OF NEW YORK.

ELECTRIC METER.

1,019,456.  Specification of Letters Patent.  Patented Mar. 5, 1912.

Application filed June 9, 1904. Serial No. 211,770.

*To all whom it may concern:*

Be it known that we, JOHN E. GRAYBILL and PAUL McJUNKIN, citizens of the United States, and residents of York, county of York, and State of Pennsylvania, have invented certain new and useful Improvements in Electric Meters, of which the following is a specification.

This invention relates to meters for measuring electric energy which may be used in connection with either alternating or direct currents.

The object of the invention is to provide an improved meter as will be hereinafter set forth.

Figure 1:
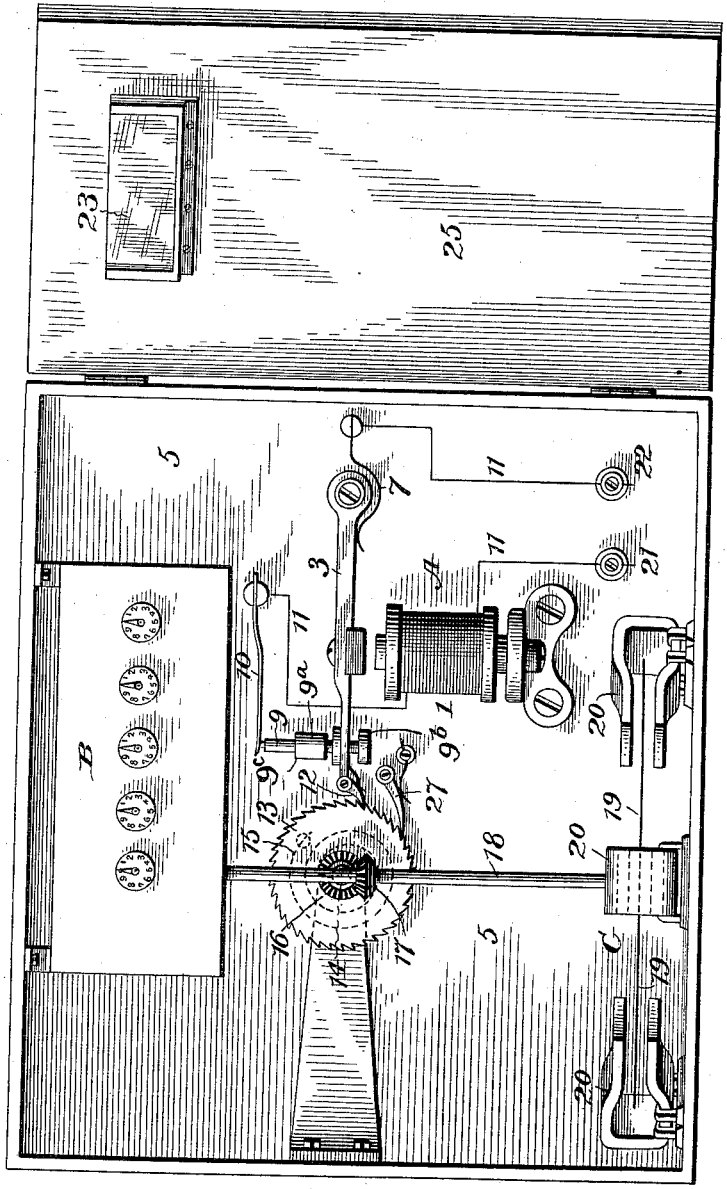
Figure 2:
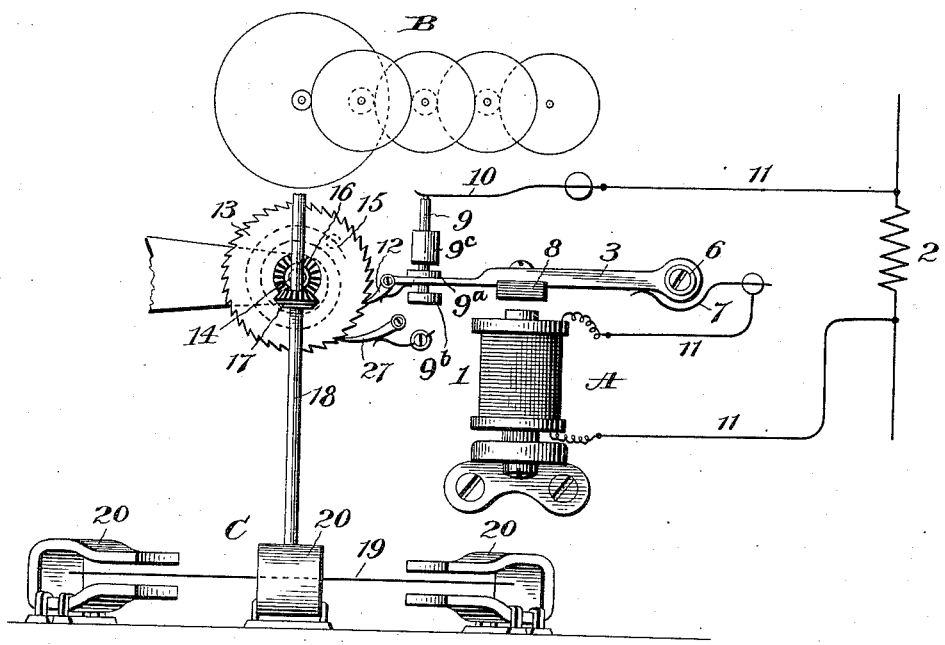
Figure 3:
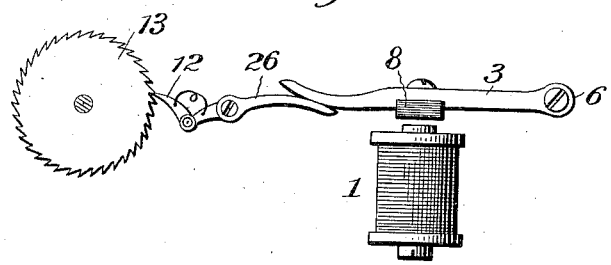

In the accompanying drawings, Figure 1 is a front elevation of a meter embodying the invention, the door being shown as open so that a view of the interior is obtained; Fig. 2 is a diagrammatic illustration showing the arrangement of circuits; and Fig. 3 shows a modification of the means for transmitting the energy from the actuating to the indicating means.

Referring to the drawings, the meter comprises an actuating means A which is alternately energized and deënergized, the energizing current being proportional to that which is to be measured, an indicating device B which may consist of the usual dials over which hands are driven in the usual manner by a train of gears, means whereby the actuating means drives the indicating device and a governing device C connected to the indicating device and actuating means and which opposes their movement in proportion to the speed at which it is driven.

The actuating means may comprise an electro-magnet 1 which may be connected in series with the line carrying the current to be measured, but as it is sufficient if the magnet carries a current proportional to the current to be measured, it is preferably connected in shunt to a resistance 2 located in the circuit in which it is desired to measure the current flow. The actuating means may further comprise a lever 3 pivoted to the frame or casing 5 at 6 and normally held in elevated position as by a spring 7. This lever may be of magnetizable material as iron, when it would in itself constitute an armature for the electro-magnet, or it may be of non-magnetizable material, as brass, to which a piece of iron 8 may be secured, which iron serves as an armature to the magnet and causes the lever 3 to be oscillated as the magnet is energized and deënergized. Upon the lever 3 may be mounted a contact 9 adapted to engage with a spring contact 10 and thereby complete the circuit 11 of the electro-magnet when the lever is in its uppermost position, but when the lever is attracted downwardly, it will, near the lower end of its movement, draw the contact 9 out of engagement with the spring 10 and thereby break the circuit of and deënergize the magnet. As shown the contact pin 9 is provided with two collars $9^a$, $9^b$, between which the lever 3 extends, the pin passing through a stationary guide $9^c$. The guide $9^c$ is of such character that the contact pin will normally be held stationary in either of the positions to which it may be adjusted. With the contact positioned as shown in the drawing, the circuit 11 will remain closed until in its downward movement the lever 3 through engagement with the collar $9^b$ draws the contact away from spring 10, as above referred to. It will be obvious that the energization and deënergization of the electro-magnet may be accomplished in other ways than by making and breaking its circuit as described. For instance, the desired result may be secured by making and breaking a short circuit about the electro-magnet, and other methods well known to persons skilled in the art might be employed. Upon the deënergization of the magnet the spring 7 will return the lever 3 to its elevated position and near the upper end of its travel will by engagement with the collar $9^a$ move the contact 9 into engagement with the spring 10 and remake the circuit, when the electro-magnet will again become energized and the operation be repeated. Upon the end of the lever 3 may be mounted a pawl 12, spring pressed into engagement with a ratchet wheel 13 loosely mounted on a shaft 14 and connected thereto by an energy storing device as a spring 15. The shaft 14 is rotatably supported by the casing 5 and the beveled gear 16 is fixed thereto. The beveled gear 16 engages with a similar gear 17 fixed to the vertical shaft 18 which is rotatably supported by the casing. The shaft 18 is geared to the indicating device in any suitable or known manner. Fixed to the shaft is a conductor 19 forming part of the governing device, which may consist of a disk of copper or other conducting material.

The remainder of the device consists in a means for maintaining a constant field within which the conductor or disk may be moved and preferably consists in permanent magnets 20 fixed to the casing. The field within which the conductor moves being constant, it follows from well known laws that the opposition of the conductor or disk to motion is proportional to its speed, and therefore the opposition of the governing device to the movement of the actuating means and of the indicating device will vary in proportion to its speed. To prevent backward movement of the ratchet wheel 13 a pivoted dog 27 may be spring pressed into engagement with the ratchet wheel.

For convenience in connecting the external circuits to the circuits of the meter, terminals 21 and 22 fixed to the casing are provided. A window 23 in the door 25 permits observation of the dials of the indicating device when the door is closed.

Having described an embodiment of the invention, its operation may be outlined as follows: The parts being in the positions shown, if current flows in the main circuit and therefore through the resistance 2, current will be shunted through the electromagnet 1 in proportion to the current in the resistance 2. The magnet being thus energized it will attract the armature and thereby draw down the lever 3 against the spring 7. This movement of the lever operates through the pawl 12 to turn the ratchet wheel 13 and thereby wind up the spring 15. The tension thus caused in the spring operates to turn the gears of the indicating device and also the conductor 19 of the governing device. As the lever nears the end of its travel under the effect of the attraction exerted upon it by the electromagnet the contact 9 will be moved away from the spring 10, thereby breaking the circuit 11 and deënergizing the electromagnet. The lever then returns to its uppermost position under the pressure of spring 7. Near the end of this return movement the contact 9 will again make the circuit of the electro-magnet, when the lever will again be drawn toward the magnet and the ratchet wheel 13 can move forward. At each impulse given the ratchet wheel greater tension will be produced in the spring 15, which in turn will tend to drive the conductor 19 faster and faster, and, as we have seen, the opposition of this conductor to rotation is proportional to its speed. Oscillation of the lever 3, as described, will continue until the tension in the spring 15 becomes so great that the magnet can no longer attract its armature against the force of the spring, which will occur when the speed of the conductor 19 has become such as to oppose motion by a force equal to the effort exerted by the magnet upon the lever 3. This condition having been reached, the arm will remain at rest until either the spring 15 unwinds or the current in the magnet changes. If it be assumed that the current remain constant, as the spring unwinds it will exert less force upon the conductor 19, which will have a tendency to slow down, but as the decreased tension in the spring is now overcome by the effort of the electro-magnet, a fresh impulse is given to the ratchet wheel and the spring is again wound to the proper tension. Should the current fall in value the spring will have to become unwound to a greater extent and consequently the conductor 19 be run at a slower speed before the lever 3 can be actuated to drive the ratchet wheel and wind the spring. Conversely, should the current increase, the lever 3 will be operated against a greater tension of the spring 15 which will therefore operate the conductor 19 at a greater speed. It will thus be seen that the speed of the conductor 19 is proportional to the current in the resistance 2, and therefore the indicating device will be driven in proportion to the current and the indications be recorded in any suitable manner.

If desired the energy storing device, as spring 15, may be dispensed with and the motion of the ratchet wheel 13 be communicated directly to the indicating device and conductor 19. It is preferable, however, that the force exerted by the pawl 12 shall be uniform throughout this stroke. These objects may be accomplished by means of the modification shown in Fig. 3, in which the pawl 12 is pivotally mounted upon a lever 26 which comes into engagement with the end of the lever 3, the engaging ends of the levers 3 and 26 being curved surfaces so that the leverages are such that throughout the stroke of the lever B the pawl 12 exerts a uniform effort upon the ratchet wheel 13. Other means for transmitting the energy of the magnet uniformly to the driven mechanism than that described may be employed.

After starting the disk 19 acts as a fly wheel and maintains continuous operation of the indicating device. Although shown as embodied in the governor, the fly wheel or other momentum device may be separate therefrom.

While the invention has been illustrated in connection with a meter for measuring current, it will be obvious to those skilled in the art that it may be employed in a large number of meters for measuring electric energy.

The principal difference between volt meters and current measuring instruments or ammeters is that the former are usually of much higher resistance than the latter, for the reason that the coils are usually connected across terminals differing greatly in potential. In fact the current measuring instrument illustrated may be considered as a volt meter which measures the potential difference between the terminals of the resistance 2, which potential varies with the current flowing in said resistance.

This meter may be used for measuring current or voltage, as explained above. The meter may also be used as a watt meter if the iron armature be replaced by a coil and this coil energized by a current varying either with the current or potential in the circuit to be measured, the electro-magnet being energized by a current varying with either the potential or current in circuit. In this case it will be obvious that the pull upon the lever 3 will be proportional to the product of the fluxes set up by the two coils, that is, to the product of voltage and current or the watts in the circuit to be measured, and this construction being a well known one has not been illustrated.

While the attraction of the armature by the electro-magnet has been spoken of, it will be understood that repulsion of the armature is equivalent thereto and by an armature it is intended to express a member which is set in motion by the magnetic effect of the electro-magnet, whether said member consists in magnetizable material or a coil of wire in which current may be caused to flow. The conductor 19 may be a wound armature and numerous other modifications may be made without departing from the spirit and scope of the invention and it should not therefore be limited to the specific construction illustrated.

Without being limited to the precise construction shown and described, what we claim is:—

1. In an electric meter, in combination, an alternately energized and deënergized actuating electro-magnet, indicating means acted upon by each operation of said actuating magnet, a progressively moving governing means opposing the operation of said actuating means in proportion to its speed and an energy storing device operated by said electro-magnet and progressively driving said governing device.

2. In an electric meter, in combination, an alternately energized and deënergized actuating electro-magnet, an electro-magnet governing device having an opposition to movement which is proportional to its speed, an indicating device progressively driven by said actuating magnet and an energy storing device operated by said electro-magnet and progressively driving said governing device.

3. In an electric meter in combination, an alternately energized and deënergized actuating electro-magnet, a governing device having an opposition to movement which is proportional to its speed, connections including a spring connecting said governing device and said actuating magnet and an indicating device connected with said governing device.

4. In an electric meter, the combination with alternately energized and deënergized electro-magnetic actuating means consisting of an electro-magnet, of an armature oscillated thereby, a contact carried by said armature and located in the circuit of said electro-magnet, a governing device comprising a conductor moving in a constant field, a pawl and ratchet connection between said armature and said governing device, and an indicating device connected with said governing device, substantially as described.

5. In an electric meter, the combination with alternately energized and deënergized electro-magnetic actuating means, of a governing device having an opposition to movement which is proportional to its speed, an energy storing device connecting said governing device and said actuating means, and an indicating device connected with said governing device, substantially as described.

6. In an electric meter, the combination with alternately energized and deënergized electro-magnetic actuating means consisting of an electro-magnet, of an armature oscillated thereby, a contact carried by said armature and located in the circuit of said electro-magnet, a governing device comprising a conductor moving in a constant field, a pawl and ratchet and a spring connecting said armature and said governing device, and an indicating device connected with said governing device, substantially as described.

7. In an electric meter, the combination with alternately energized and deënergized electro-magnetic means consisting of an electro-magnet, of an armature oscillated thereby, a contact carried by said armature and located in the circuit of said electro-magnet, a governing device comprising a conductor moving in a constant field, a pawl and ratchet and an energy storing device connecting said armature and said governing device, and an indicating device connected with said governing device, substantially as described.

8. In an electric meter, the combination with an electro-magnetic actuating means having a stationary member and an oscillating member, of a governing device comprising a conductor moving in a constant field, a ratchet wheel, a spring connected with said conductor and said ratchet wheel, a pawl connected to said oscillating member of the actuating means and engaging said ratchet wheel to move it in one direction only, and an indicating device connected with said conductor of the governing device.

9. In an electric meter, the combination with an electro-magnet, of a ratchet, a governing device, gearing connecting the governing device and ratchet and including a coiled spring, means operated by the armature of the magnet for actuating the ratchet and winding said spring, an indicating device connected with the governing device, and contacts operated by said armature to energize and deënergize the magnet, substantially as described.

10. In an electric meter, the combination with an electro-magnet, of an oscillating armature for the magnet, contacts operated by the armature to energize and deënergize the magnet as the armature is oscillated, a ratchet adapted to be rotated as the armature is oscillated, a governing device, connections between the governing device and ratchet including a spring adapted to be placed under tension as the ratchet is turned by the armature, and an indicating device connected with the governing device, substantially as described.

In testimony whereof we have signed our names to this specification in the presence of two subscribing witnesses.

JOHN E. GRAYBILL.
PAUL McJUNKIN.

Witnesses:
ELLEN M. WELLENSIEK,
SMYSER WILLIAMS.

Copies of this patent may be obtained for five cents each, by addressing the "Commissioner of Patents, Washington, D. C."